(12) United States Patent
Shen (10) Patent No.: US 11,206,099 B2
(45) Date of Patent: Dec. 21, 2021

(54) SLOT FORMAT INDICATION METHOD AND RELATED PRODUCT

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/875,466

(22) Filed: May 15, 2020

(65) Prior Publication Data

US 2020/0280388 A1 Sep. 3, 2020

Related U.S. Application Data

(63) Continuation of application No. PCT/CN2017/111619, filed on Nov. 17, 2017.

(51) Int. Cl.
*H04W 72/04* (2009.01)
*H04L 1/00* (2006.01)
*H04L 5/00* (2006.01)

(52) U.S. Cl.
CPC .......... *H04L 1/0006* (2013.01); *H04L 5/0082* (2013.01); *H04W 72/0446* (2013.01); *H04W 72/0453* (2013.01)

(58) Field of Classification Search
None
See application file for complete search history.

(56) References Cited

U.S. PATENT DOCUMENTS

2017/0171846 A1 6/2017 Zhao et al.
2017/0332359 A1 11/2017 Tsai et al.
2019/0165904 A1* 5/2019 Jo .......................... H04J 11/00

FOREIGN PATENT DOCUMENTS

| CN | 101282160 | 10/2008 |
|---|---|---|
| CN | 101572683 | 11/2009 |
| CN | 101610491 | 12/2009 |
| CN | 101610578 | 12/2009 |
| CN | 104363975 | 2/2015 |
| CN | 107210810 | 9/2017 |

(Continued)

OTHER PUBLICATIONS

Apple Inc., "Content for Group-common PDCCH," 3GPP TSG-RAN WG1 NR#2, R1-1714091, Aug. 2017, 4 pages.

(Continued)

*Primary Examiner* — Willie J Daniel, Jr.
(74) *Attorney, Agent, or Firm* — Hodgson Russ LLP (57) ABSTRACT

Embodiments of the present application disclose a slot format indication method and a related product. The method comprises: a network device transmits a slot format indicator (SFI) to a terminal, the SFI being used for indicating a slot format of at least one carrier, the at least one carrier comprising a first carrier, the slot format indicated by the SFI being determined on the basis of a first subcarrier spacing, and a subcarrier spacing of the first carrier being an integer multiple of the first subcarrier spacing. According to the embodiments of the present application, the slot format of one or more carriers can be indicated without relying on the subcarrier spacing of a particular carrier.

16 Claims, 4 Drawing Sheets

(56) References Cited

FOREIGN PATENT DOCUMENTS

| JP | 2020078085 | 5/2020 |
|---|---|---|
| JP | 2020523850 | 8/2020 |
| RU | 2551823 | 5/2015 |
| WO | 2017133597 | 8/2017 |
| WO | 2017188664 | 11/2017 |
| WO | 2019030925 | 2/2019 |

OTHER PUBLICATIONS

LG Electronics, "Discussion on group common PDCCH," 3GPP TSG RAN WG1 #90bis, R1-1717953, Oct. 2017, 11 pages.
Intel Corporation, "On group-common PDCCH," 3GPP TSG RAN WG1 Meeting NR#3, R1-1716308, Sep. 2017, 10 pages.
LG Electronics, "Discussion on group common PDCCH," 3GPP TSG RAN WG1 NR Ad Hoc #3, R1-1715873, Sep. 2017, 7 pages.
Oppo, "Remaining issues on GC-PDCCH," 3GPP TSG RAN WG1 Meeting #91, R1-1719984, Dec. 2017, 8 pages.
Vivo, "Design of group-common PDCCH," 3GPP TSG RAN WG1 NR Meeting 90bis, R1-1717485, Oct. 2017, 10 pages.
ZTE et al., "Remaining details on group-common PDCCH," 3GPP TSG RAN WG1 Meeting #90bis, R1-1717512, Oct. 2017, 6 pages.
SIPO, First Office Action for CN Application No. 201780091683.8, dated May 8, 2020.
WIPO, ISR for PCT/CN2017/111619, dated Jul. 25, 2018.
LG Electronics, "Discussion on the contents of group common PDCCH," 3GPP TSG RAN WG1 Meeting #90, R1-1713171, Aug. 2017, 8 pages.
NTT Docomo, Inc., "Remaining issues on group-common PDCCH," 3GPP TSG RAN WG1 Meeting 90bis, R1-1718205, Oct. 2017, 10 pages.
EPO, Extended European Search Report for EP Application No. 17932429.8, dated Oct. 9, 2020.
FIPS, Office Action for RU Application No. 2020119778, dated Nov. 30, 2020.
EPO, Communication for EP Application No. 17932429.8, dated Jun. 2, 2021.
ISDEC, Office Action for CA Application No. 3082701, dated Jun. 11, 2021.
IPI, Office Action for IN Application No. 202017025103, dated Jul. 29, 2021.
JPO, Office Action for JP Application No. 2020-526469, dated Sep. 28, 2021.

* cited by examiner

SLOT FORMAT INDICATION METHOD AND RELATED PRODUCT

CROSS-REFERENCE TO RELATED APPLICATION

This application is a continuation of International Application No. PCT/CN2017/111619, filed Nov. 17, 2017, the entire disclosure of which is incorporated herein by reference.

TECHNICAL FIELD

The present application relates to the field of communication technologies, and in particular, to a method for indicating a slot format and a related product.

BACKGROUND

In a new radio (NR) system, slot or Orthogonal Frequency Division Multiplexing (OFDM) symbol is used as a scheduling unit, and each slot includes 14 OFDM symbols. The frame structure of the NR system can be flexibly configured. A symbol for downlink (DL), a symbol for uplink (UL), a reserved symbol, and an unknown symbol may be in one slot, for example, the slot format is configured by using semi-static DL/UL configuration information. The configuration information may indicate the numbers and the positions of the DL, the UL, the reserved symbol and the unknown symbol in the slot. The reserved symbol is not used for DL or UL transmission, but the unknown symbol may be rewritten by Downlink Control Information (DCI) signaling to be used for DL or UL transmission. For example, the base station may send a slot format indicator (SFI) through a dynamic signaling group common PDCCH (GC-PDCCH), and indicate a new slot format by changing the semi-statically configured unknown symbol to DL or UL symbol. The symbol for DL, the symbol for UL, and the unknown symbol may be indicated in the SFI.

The multi-carrier system supports cross-carrier slot format indicator, that is, the SFI sent on a certain carrier may indicate the slot format on another carrier. How to use the SFI sent on the certain carrier to indicate the slot format on another carrier is a technical problem that is being studied by those skilled in the art.

SUMMARY

Embodiments of the present application provide a slot format method and a related product, which can realize the indication of the slot format of one or more carriers without depending on a subcarrier spacing of a specific carrier.

In a first aspect, the embodiments of the present application provide a method for indicating a slot format, including:

sending, by a network device, a slot format indicator (SFI) to the terminal, where the SFI is used to indicate a slot format of at least one carrier, the at least one carrier includes a first carrier, the slot format indicated by the SFI is determined based on a first subcarrier spacing, and a subcarrier spacing of the first carrier is an integer multiple of the first subcarrier spacing In a second aspect, the embodiments of the present application provide a method for indicating a slot format, including:

receiving, by a terminal, a slot format indicator (SFI) sent by a network device, where the SFI is used to indicate a slot format of at least one carrier, the at least one carrier includes a first carrier, the slot format indicated by the SFI is determined based on a first subcarrier spacing, and a subcarrier spacing of the first carrier is an integer multiple of the first subcarrier spacing; and determining, by the terminal, a slot format on each of the at least one carrier according to the SFI.

In a third aspect, the embodiments of the present application provide a network device, and the network device has a function of implementing the behavior of the network device in the above first aspect. The function may be implemented by hardware, and may also be implemented by hardware executing corresponding software. The hardware or software includes one or more modules corresponding to the above functions. In a possible design, the network device includes a processor configured to support the network device to perform a corresponding function in the above method. Further, the network device may further include a transceiver, and the transceiver is configured to support communication between the network device and the terminal. Further, the network device may further include a memory, which is used for coupling with the processor, and storing the program instructions and data necessary for the network device.

In a fourth aspect, the embodiments of the present application provide a terminal that has a function of implementing the behavior of the terminal in the above second aspect. The function may be implemented by hardware, and may also be implemented by hardware executing corresponding software. The hardware or software includes one or more modules corresponding to the function described above. In a possible design, the terminal includes a processor configured to support the terminal to perform a corresponding function in the above method. Further, the terminal may further include a transceiver, and the transceiver is configured to support communication between the terminal and the network device. Further, the terminal may further include a memory, which is used for coupling with the processor, and storing the program instructions and data necessary for the terminal.

In a fifth aspect, the embodiments of the present application provide a network device, including a processor, a memory, a transceiver, and one or more programs, where the one or more programs are stored in the memory, and are configured to be executed by the processor, and the program includes instructions for executing steps in any method in the first aspect of the embodiments of the present application.

In a sixth aspect, the embodiments of the present application provide a terminal, including a processor, a memory, a communication interface, and one or more programs, where the one or more programs are stored in the memory and configured to be executed by the processor, and the program includes instructions for executing steps in any method in the second aspect of the embodiments of the present application.

In a seventh aspect, the embodiments of the present application provide a computer-readable storage medium, where the computer-readable storage medium stores a computer program for indicating a slot format, and the computer program causes a computer to execute some or all of the steps described in any of the methods of the first aspect of the embodiments of the present application.

In an eighth aspect, the embodiments of the present application provide a computer-readable storage medium, where the computer-readable storage medium stores a computer program for indicating a slot format, and the computer program causes a computer to execute some or all of the steps described in any of the methods of the second aspect of the embodiments of the present application.

In a ninth aspect, the embodiments of the present application provide a computer program product, where the computer program product includes a non-transitory computer-readable storage medium storing a computer program, and the computer program is operable to make a computer execute some or all of the steps described in any method of the first aspect of the embodiments of the present application. The computer program product may be a software installation package.

In a tenth aspect, the embodiments of the present application provide a computer program product, where the computer program product includes a non-transitory computer-readable storage medium storing a computer program, and the computer program is operable to cause a computer to execute some or all of the steps described in any method of the second aspect of the embodiment of the present application. The computer program product may be a software installation package.

It can be seen that, in the embodiments of the present application, the slot format indicated by the SFI is determined based on the first subcarrier spacing. The subcarrier spacing of any one of the at least one carrier is an integer multiple of the first subcarrier spacing. Therefore, when the at least one carrier is multiple carriers, the embodiments of the present application can be used to implement the indication of the slot formats of the multiple carriers; and when the at least one carrier includes only the first carrier, the embodiments of the present application can be used to indicate the slot format of the first carrier independent of the carrier spacing of the first carrier.

BRIEF DESCRIPTION OF THE DRAWINGS

The drawings needed to be used in the embodiments or the description of the related art will be briefly introduced below.

DETAILED DESCRIPTION

The technical solutions in the embodiments of the present application will be described below with reference to the drawings.

Figure 1:
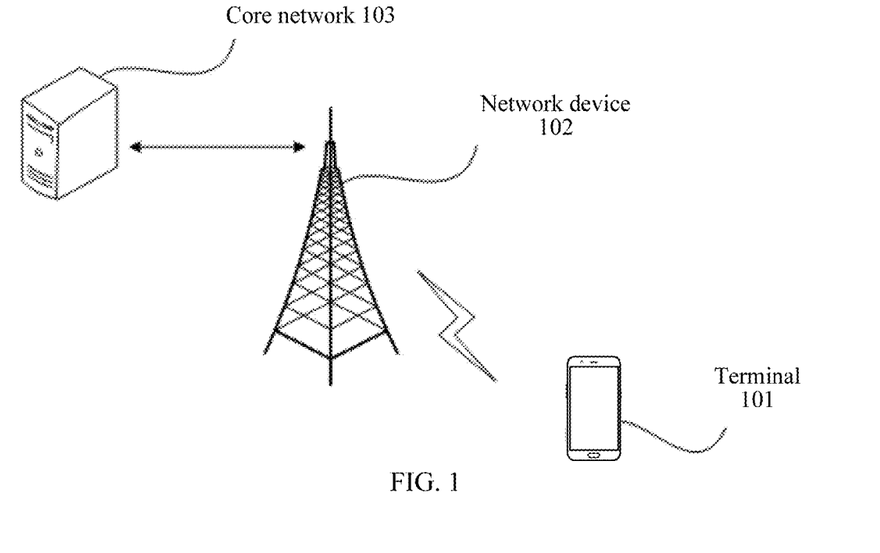
FIG. 1 is a schematic structural diagram of a wireless communication system according to an embodiment of the present application.

Referring to FIG. 1, which is a schematic structural diagram of a wireless communication system 100 according to an embodiment of the present application, the wireless communication system includes at least a terminal 101, a network device 102, and a core network 103. Optionally, the devices in the wireless communication system 10 may use wireless communication technology for communication. For example, the wireless communication technology may be the second generation mobile communication technology (The 2nd-Generation, 2G), the third generation mobile communication technology (The 3rd-Generation, 3G), long term evolution (LTE), the 4th Generation mobile communication (4G), the 5th-Generation (5G), or WIreless Fidelity (WI-FI) technology, or Bluetooth technology, or zigbee technology, or other existing communication technologies, or subsequent researched communication technologies, and so on.

The terminal 101 may be a handheld device (for example, a mobile phone, a tablet computer, a palmtop computer, etc.) with wireless communication functions, an in-vehicle device (for example, a car, a bicycle, an electric vehicle, an airplane, a ship, a train, a high-speed rail, etc.), a wearable device (e.g. a smart watch, a smart bracelet, a pedometer, etc.), smart home equipment (e.g. a refrigerator, a TV, an air conditioner, an electricity meter, etc.), flight equipment (e.g. an unmanned aerial vehicle, an airplane), a smart robot, workshop equipment, other processing equipment capable of connecting to a wireless modem, as well as various forms of user equipment, mobile station (MS), terminal, terminal equipment, and so on.

The network device 102 (the number of which may be one or more) may be a network-side device, for example, a base station in 5G, a base station in 4G, or any other device that can implement a wireless network access function, and so on. The core network 103 is configured to configure transmission services of the network device 102, for example, to configure parameters related to Quality of Service (QoS).

It should be noted that the wireless communication system 100 shown in FIG. 1 is only for a clear explanation of the technical solution of the present application, and does not constitute a limitation on the present application. Those skilled in the art may know that with the evolution of network architecture and the emergence of new service scenarios, the technical solutions provided in this application are also applicable to similar technical problems.

The related technologies involved in this application are described below.

Currently, the multi-carrier system and the multi-bandwidth part (bandwidth part, BWP) support cross-carrier slot format indicator, that is, the SFI sent on a certain carrier may indicate the slot format on another carrier. How to use the SFI sent on a certain carrier to indicate the slot format on another carrier is a technical problem that is being studied by those skilled in the art.

In view of the above problem, the embodiments of the present application propose the following embodiments, which are described below with reference to the accompanying drawings.

Figure 2:
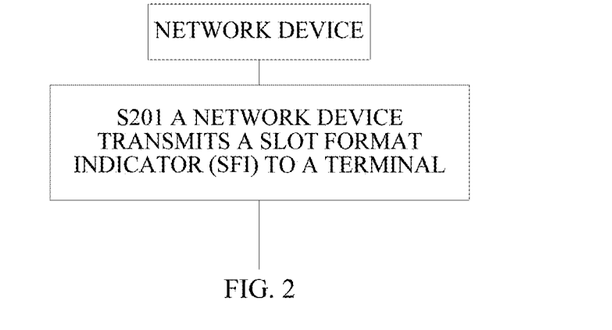
FIG. 2 is a schematic flowchart of a method for indicating a slot format according to an embodiment of the present application.

Referring to FIG. 2, which is a schematic flowchart of a method for indicating a slot format provided by an embodiment of the application. The method may be implemented based on the architecture shown in FIG. 1 or may be implemented based on other architectures. The method includes, but is not limited to the following steps.

In step S201: the network device sends a slot format indicator (SFI) to the terminal, the SFI is used to indicate a slot format of at least one carrier, the at least one carrier includes a first carrier, the slot format indicated by the SFI is determined based on a first subcarrier spacing, and a subcarrier spacing of the first carrier is an integer multiple of the first subcarrier spacing.

Specifically, the first subcarrier spacing is a subcarrier spacing of other carrier except the first carrier, or the first subcarrier spacing is not a subcarrier spacing of a particular carrier, but is a value capable of measuring the subcarrier spacing. It is not excluded that the value of the first subcarrier spacing is the same as the subcarrier spacing of the first carrier, but essentially the slot format indicated by the SFI is not determined based on the subcarrier spacing of the first carrier. In addition, the SFI is used for a slot format of one slot on the first carrier, or the SFI is used for the slot formats of at least two slots on the first carrier.

There is a certain relationship between the number of slot(s) whose slot format is indicated on each carrier of the at least one carrier and the first subcarrier. Assuming that the target carrier is any one of the at least one carrier, then the subcarrier spacing of the target carrier is X times of the first subcarrier spacing; and the number of the slots indicated by the SFI on the target carrier is X*Y times, where X and Y are both positive integers. It can be understood that when the target carriers are different carriers, the value of X here may also be different. It can be known from this that the subcarrier spacing of the first carrier is also an integer multiple of the first subcarrier spacing.

In a possible example, the at least one carrier further includes a second carrier; a subcarrier spacing of the second carrier is the first subcarrier spacing (optionally, the first subcarrier spacing is a subcarrier spacing on the second carrier at a moment of sending the SFI), the subcarrier spacing of the first carrier is the second subcarrier spacing, and if the second subcarrier spacing is N times of the first subcarrier spacing, the number of slots indicated by the SFI on the first carrier is N times of the number of slots indicated by the SFI on the second carrier, where N is a positive integer.

For example, assuming that the subcarrier spacing of the second carrier is 15 KHz and the subcarrier spacing of the first carrier is 60 KHz, that is, the subcarrier spacing of the first carrier is 4 times of the subcarrier spacing of the second carrier, then, the number of the slots on the first carrier is 4 times of the number of the slots on the second carrier. For example, if there are 10 slots on the second carrier, then there are 40 slots on the first carrier in the same time. Due to such a relationship between the subcarrier spacing of the carrier and the number of slots, in the embodiments of the present application, when the SFI is used to indicate the slot format of the first carrier and the slot format of the second carrier, the relationship between the number of slots indicated on the first carrier and the number of slots indicated on the second carrier is as follows: if the subcarrier spacing (that is, the second subcarrier spacing) of the first carrier is N times of the subcarrier spacing of the second carrier (that is, the first subcarrier spacing), then the number of slots indicated by the SFI on the first carrier is N times of the number of slots indicated by the SFI on the second carrier.

For example, assuming that the subcarrier spacing of the second carrier (that is, the first subcarrier spacing) is 15 KHz, the number of slots on the second carrier is 100, and the subcarrier spacing of the first carrier (that is, the second subcarrier spacing) is 60 KHz, then the number of slots on the first carrier in the same time is 400. In addition, assuming that each SFI indicates a structure of 10 slots on the second carrier, then each SFI indicates 40 slot formats on the first carrier. In this way, it is possible to indicate the slot formats of 100 slots on the second carrier and the slot formats of 400 slots on the first carrier through 10 SFIs.

As another counter example, assuming that the subcarrier spacing of the second carrier (that is, the first subcarrier spacing) is 15 KHz, the number of slots on the second carrier is 100, and the subcarrier spacing of the first carrier (that is, the second subcarrier spacing) is 60 KHz, then the number of slots on the first carrier in the same time is 400. It is also assumed that each SFI indicates a structure of 10 slots on the second carrier, and each SFI indicates 10 slot formats on the first carrier, in this way, the slot formats of 100 slots on the second carrier and the slot formats of 100 slots on the first carrier can be indicated through 10 SFIs, but there are still slot formats of 300 slots on the first carrier not indicated. For this problem, additional SFIs may be configured to indicate the slot formats of the remaining 300 slots on the first carrier, but which may cause additional communication overhead; or the structures of the remaining 300 slots on the first carrier are not indicated, but a waste of these 300 slot resources may be occurred.

In addition, the relationship between the number of slots indicated by the SFI on the second carrier and the number of slots indicated by the SFI on the first carrier is only an example. In fact, between any two of the multiple carriers, if the subcarrier spacing of one carrier is N times of the subcarrier spacing of another carrier, then the number of slots indicated by the SFI on the another carrier is N times of the number of slots indicated by the SFI on the one carrier.

For example, supposing that the carrier with the smallest subcarrier spacing among the multiple carriers is called carrier 1, the multiple carriers also include at least a carrier 2, a carrier 3, a carrier 4, and a carrier 5, if the subcarrier spacing of the carrier 1 is 7.5 KHz, the subcarrier spacing of the carrier 2 is 15 KHz, the subcarrier spacing of the carrier 3 is 30 KHz, the subcarrier spacing of the carrier 4 is 60 KHz, and the subcarrier spacing of the carrier 5 is 120 KHz, then the number of slots on the carrier 2 indicated by the above SFI is twice as much as the number of slots on the carrier 1 indicated by the SFI, and the number of slots on the carrier 3 indicated by the SFI is 4 times of the number of slots on the carrier 1 indicated by the SFI, the number of slots on the carrier 4 indicated by the SFI is 8 times of the number of slots on the carrier 1 indicated by the SFI, and the number of slots on the carrier 5 indicated by the SFI is 16 times of the number of slots on the carrier 1 indicated by the SFI.

The embodiment of the present application describes the number of indicated slots on each carrier, but it does not specifically limit which slot or slots is indicated. For example, the first carrier contains 100 slots, and the above SFI indicates 5 slots among the 100 slots, but it is not specifically limited which 5 slots of the 100 slots are the above-mentioned 5 slots.

In a possible example, a start time of the $i^{th}$ slot indicated by the SFI on the second carrier is the same as a start time of the $[(i-1)*N+1]^{th}$ slot indicated by the SFI on the first carrier, an end time of the $i^{th}$ slot indicated by the SFI on the second carrier is the same as an end time of the $(i*N)^{th}$ slot indicated by the SFI on the first carrier, and the slot formats of the $[(i-1)*N+1]^{th}$ slot to the $(i*N)^{th}$ slot indicated by the SFI on the first carrier are the same, where i is a positive integer, and strictly speaking, i is not greater than the number of slots indicated by the SFI on the second carrier.

For example, if N=5 and there are 10 slots on the second carrier, there will be 50 slots on the first carrier. Based on the above rule, it can be known that i can take a positive integer between 1 and 5. When i=1, the start time of the first slot indicated by the SFI on the second carrier is the same as the start time of the first slot indicated by the SFI on the first carrier, the end time of the first slot on the second carrier indicated by the SFI is the same as the end time of the fifth slot indicated by the SFI on the first carrier, and the slot formats of the first to fifth slots indicated by the SFI on the first carrier are the same. When i=2, the start time of the second slot indicated by the SFI on the second carrier and the start time of the sixth slot indicated by the SFI on the first carrier are the same, the end time of the second slot indicated by the SFI on the second carrier is the same as the end time of the tenth slot indicated by the SFI on the first carrier, and the slot formats of the sixth to tenth slots indicated by the SFI on the first carrier are the same. When i takes other values, it can be deduced by analogy, no more examples are given here.

In a possible example, if the start time of the $i^{th}$ slot indicated by the SFI on the second carrier is aligned with the start time of the $[(j-1)*N+1]^{th}$ slot indicated by the SFI on the first carrier, then the end time of the $i^{th}$ slot indicated by the SFI on the second carrier is aligned with the end time of the $(j*N)^{th}$ slot indicated by the SFI on the first carrier, and the slot formats of the $[(j-1)*N+1]^{th}$ to $(j*N)^{th}$ slots indicated by the SFI on the first carrier are the same, where i and j are positive integers.

In a possible example, the first subcarrier spacing is a pre-configured subcarrier spacing. For example, the first subcarrier spacing is predefined in a protocol for use, and both the network device and the terminal learn the first subcarrier spacing.

In a possible example, the first subcarrier spacing is a subcarrier spacing of a carrier carrying the SFI, that is, on which carrier the SFI is to be sent, the subcarrier spacing of this carrier is the first subcarrier spacing, and the carrier carrying the SFI is not the first carrier described above, that is, the SFI is first determined by the subcarrier spacing of the carrier carrying the SFI, so that the SFI can indicate the slot format of the slot on the first carrier.

In a possible example, before the network device sends a slot format indicator (SFI) to the terminal, the method further includes: the network device sending configuration information to the terminal, and accordingly, the terminal receiving the configuration information sent by the network device, where the configuration information is used to indicate the first subcarrier spacing. That is, the first subcarrier spacing is indicated by the network device sending the configuration information in a semi-static or dynamic manner, and the configuration information may also be included in the above SFI.

Further, the configuration information sent by the network device may be broadcast information, radio resource control (RRC) signaling, or control information.

In a possible example, the SFI includes a carrier number identifier, and the carrier number identifier is used to indicate the number of carriers in the at least one carrier. That is to say, the number of the at least one carrier needs to be indicated by the carrier number identifier. For example, the SFI contains a field for encapsulating the carrier number identifier. When the value of the field is 011, it indicates that the number of carriers in the at least one carrier is specifically 3. When the value of this field is 101, it indicates that the number of carriers in the at least one carrier is specifically 5.

In a possible example, the SFI includes at least one carrier index, and the number of the carrier index(es) in the at least one carrier index is the same as the number of carrier(s) in the at least one carrier. Each carrier index of the at least one carrier index is for indicating one carrier among the at least one carrier, and the carriers indicated by different carrier indexes in the at least one carrier index are different.

In a possible example, the SFI includes a slot format index. Optionally, the slot format index may be one or multiple. When it is one, the slot formats of all the slots on the at least one carrier are the slot format represented by the one slot format index. When there are multiple slot format indexes, the number of the slot format indexes in the multiple slot format indexes may be the same as the number of the carriers in the at least one carrier, in this way, one slot format index indicates the slot format of the slot on one carrier.

In a possible example, when the at least one carrier is multiple carriers, the SFI includes one slot format identical indication field, which field is used to indicate whether the slots on all carriers indicated by the SFI use the same slot format. For example, if the SFI contains 1 bit of the slot format identical indication field, then when the bit is 1, it indicates that the slots on all carriers indicated by the SFI have the same slot format. At this time, one slot format index may be used to indicate the slot format of the slots on all carriers. When this bit is 0, it means that the slots on all carriers indicated by the SFI have different slot formats. At this time, it is necessary to use the same number of slot format indexes as the number of carriers indicated by the SFI to respectively indicate the slot formats on individual carriers.

Figure 3:
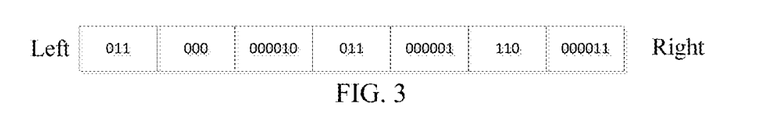
FIG. 3 is a schematic diagram of a structure of a field included in a slot format indicator (SFI) according to an embodiment of the present application.

For example, in a multi-carrier system or multi-BWP, the terminal supports 8 carriers (numbered 0 to 7), and the network device may configure SFI to indicate the slot formats of N carriers, where 1<=N<=8. For example, N=3, that is, the SFI indicates the slot formats of 3 carriers. Specifically, the SFI includes a field (or domain) for indicating the number of carriers, for example, a 3-bit carrier number identifier is used to indicate the SFI to indicate the applicable number of carriers. Supposing that the SFI needs to indicate the slot formats of the carriers whose carrier indexes are 0, 3, and 6, and the SFI is sent on the carrier 0, the subcarrier spacing of the carrier 0 is 15 kHz, the subcarrier spacing of the carrier 3 is 30 kHz, the subcarrier spacing of the carrier 6 is 60 kHz, and the slot format indicated by the SFI is determined in a predefined manner based on the subcarrier spacing of the carrier 0, that is, 15 kHz. As shown in FIG. 3, FIG. 3 shows 7 fields. From left to right, the first field encapsulates the carrier number identifier 011, indicating that the slot formats of 3 carriers need to be indicated; the second field encapsulates the carrier index 000, indicating the carrier whose carrier index is 0; the slot format index 000010 encapsulated in the third field is used to indicate that the slot format of the slot on the carrier whose carrier index is 0 is the slot format indicated by the slot format index 000010, this slot format index is used to indicate the slot format of one slot on the carrier 0; the carrier index 011 encapsulated in the fourth field is used to indicate the carrier whose carrier index is 3; the slot format index 000001 encapsulated in the fifth field is used to indicate the slot format of the slot on the carrier whose carrier index is 3 is the slot format indicated by the slot format index 000001, this slot format index is used to indicate the slot formats of 2 slots on the carrier 3, and the slot formats of the 2 slots are the same; the carrier index 110 encapsulated in the sixth field is used to indicate the carrier with the carrier index of 6; the slot format index 000011 encapsulated in the seventh field is used to indicate that the slot format of the slot on the carrier whose carrier index is 6 is the slot format indicated by the slot format index 000011, this slot format index is used to indicate the slot formats of 4 slots on the carrier 6, and the slot formats of the 4 slots are the same. It can be understood that a slot format index table is pre-stored in the terminal, and each slot format index in the slot format index table represents one slot format.

It can be understood that, after receiving the SFI, the terminal parses out the information in the SFI, so as to learn the content indicated by the SFI.

Optionally, the terminal may parse out the slot formats of the slots on which carriers are indicated by the SFI, such as determining the slot formats on which carriers are indicated by the SFI based on the parsed carrier index.

Optionally, since the number of slots of which the slot formats are indicated on each carrier in the at least one carrier has a certain relationship with the first subcarrier, the subcarrier spacing of the target carrier is X times of the first subcarrier spacing; and the number of slots indicated by the SFI on the target carrier is X*Y times, X and Y being positive integers. Therefore, the terminal needs to obtain the values of X and Y here, where the values of X and Y may be specified in the protocol or may be encapsulated in the SFI for the terminal to obtain. It may also be that the terminal obtains the value of the first subcarrier by itself, and then parses out the at least one carrier from the SFI, and calculates X based on the subcarrier spacing of the target carrier in the at least one carrier. At this time, the value of Y may be specified in the protocol, or may be encapsulated in the SFI for the terminal to obtain, so that the terminal can also obtain the values of X and Y. Here, the method for obtaining the value of the first subcarrier by the terminal may be specified in the protocol, and the terminal obtains the value directly from the protocol, or the first subcarrier spacing is indicated in the SFI, or it may be detected by the terminal when receiving uplink data.

In the method shown in FIG. 2, the slot format indicated by the SFI is determined based on the first subcarrier spacing. The subcarrier spacing of any one of the at least one carrier is an integer multiple of the first subcarrier spacing. Therefore, when the at least one carrier is multiple carriers, the embodiments of the present application can be used to implement the indication of the slot formats of the multi-carrier. When the at least one carrier includes only the first carrier, the embodiments of the present application can be used to implement the indication of the slot format of the first carrier independent from the carrier spacing of the first carrier.

Figure 4:
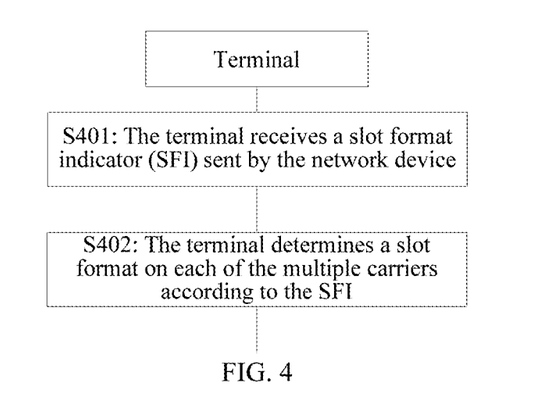
FIG. 4 is a schematic flowchart of another method for indicating a slot format according to an embodiment of the present application.

Consistent with the embodiment shown in FIG. 2, referring to FIG. 4, which is another method for indicating a slot format provided by an embodiment of the present application, the method may be implemented based on the architecture shown in FIG. 1 or may be implemented based on other architectures. The method includes, but is not limited to the following steps.

In step S401, the terminal receives a slot format indicator (SFI) sent by the network device. The SFI is used to indicate a slot format of at least one carrier, and the at least one carrier includes a first carrier. The slot format indicated by the SFI is determined based on a first subcarrier spacing, and a subcarrier spacing of the first carrier is an integer multiple of the first subcarrier spacing.

Specifically, the first subcarrier spacing is a subcarrier spacing of other carrier except the first carrier, or the first subcarrier spacing is not a subcarrier spacing of a particular carrier, but is a value capable of measuring the subcarrier spacing. It is not excluded that the value of the first subcarrier spacing is the same as the subcarrier spacing of the first carrier, but essentially the slot format indicated by the SFI is not determined based on the subcarrier spacing of the first carrier. In addition, the SFI is used for a slot format of one slot on the first carrier, or the SFI is used for the slot formats of at least two slots on the first carrier.

There is a certain relationship between the number of slots whose slot formats are indicated on each carrier of the at least one carrier and the first subcarrier. Assuming that the target carrier is any one of the at least one carrier, then the subcarrier spacing of the target carrier is X times of the first subcarrier spacing; and the number of the slots indicated by the SFI on the target carrier is X*Y times, where X and Y are both positive integers. It can be understood that when the target carriers are different carriers, the value of X here may also be different. It can be known from this that the subcarrier spacing of the first carrier is also an integer multiple of the first subcarrier spacing.

In a possible example, the at least one carrier further includes a second carrier; a subcarrier spacing of the second carrier is the first subcarrier spacing (optionally, the first subcarrier spacing is a subcarrier spacing on the second carrier at a moment of sending the SFI), the subcarrier spacing of the first carrier is the second subcarrier spacing, and if the second subcarrier spacing is N times of the first subcarrier spacing, the number of slots indicated by the SFI on the first carrier is N times of the number of slots indicated by the SFI on the second carrier, where N is a positive integer.

For example, assuming that the subcarrier spacing of the second carrier is 15 KHz and the subcarrier spacing of the first carrier is 60 KHz, that is, the subcarrier spacing of the first carrier is 4 times of the subcarrier spacing of the second carrier, then, the number of the slots on the first carrier is 4 times of the number of the slots on the second carrier. For example, if there are 10 slots on the second carrier, then there are 40 slots on the first carrier in the same time. Due to such a relationship between the subcarrier spacing of the carrier and the number of slots, in the embodiments of the present application, when the SFI is used to indicate the slot format of the first carrier and the slot format of the second carrier, the relationship between the number of slots indicated on the first carrier and the number of slots indicated on the second carrier is specifically as follows: if the subcarrier spacing (that is, the second subcarrier spacing) of the first carrier is N times of the subcarrier spacing of the second carrier (that is, the first subcarrier spacing), then the number of slots indicated by the SFI on the first carrier is N times of the number of slots indicated by the SFI on the second carrier.

For example, assuming that the subcarrier spacing of the second carrier (that is, the first subcarrier spacing) is 15 KHz, the number of slots on the second carrier is 100, and the subcarrier spacing of the first carrier (that is, the second subcarrier spacing) is 60 KHz, then the number of slots on the first carrier in the same time is 400. In addition, assuming that each SFI indicates a structure of 10 slots on the second carrier, then each SFI indicates 40 slot formats on the first carrier. In this way, it is possible to indicate the slot formats of 100 slots on the second carrier and the slot formats of 400 slots on the first carrier through 10 SFIs.

As another counter example, assuming that the subcarrier spacing of the second carrier (that is, the first subcarrier spacing) is 15 KHz, the number of slots on the second carrier is 100, and the subcarrier spacing of the first carrier (that is, the second subcarrier spacing) is 60 KHz, then the number of slots on the first carrier in the same time is 400. It is also assumed that each SFI indicates a structure of 10 slots on the second carrier, and each SFI indicates 10 slot formats on the first carrier, in this way, the slot formats of 100 slots on the second carrier and the slot formats of 100 slots on the first carrier can be indicated through 10 SFIs, but there are still slot formats of 300 slots on the first carrier not indicated. For this problem, additional SFIs may be configured to indicate the slot formats of the remaining 300 slots on the first carrier, but which may cause additional communication overhead; or the structures of the remaining 300 slots on the first carrier are not indicated, but which may result in a waste of these 300 slot resources.

In addition, the relationship between the number of slots indicated by the SFI on the second carrier and the number of slots indicated by the SFI on the first carrier is only an example. In fact, between any two of the multiple carriers, if the subcarrier spacing of one carrier is N times of the subcarrier spacing of another carrier, then the number of slots indicated by the SFI on the another carrier is N times of the number of slots indicated by the SFI on the one carrier.

For example, supposing that the carrier with the smallest subcarrier spacing among the multiple carriers is called carrier 1, the multiple carriers also include at least a carrier 2, a carrier 3, a carrier 4, and a carrier 5, if the subcarrier spacing of the carrier 1 is 7.5 KHz, the subcarrier spacing of the carrier 2 is 15 KHz, the subcarrier spacing of the carrier 3 is 30 KHz, the subcarrier spacing of the carrier 4 is 60 KHz, and the subcarrier spacing of the carrier 5 is 120 KHz, then the number of slots on the carrier 2 indicated by the above SFI is twice as much as the number of slots on the carrier 1 indicated by the SFI, the number of slots on the carrier 3 indicated by the SFI is 4 times of the number of slots on the carrier 1 indicated by the SFI, the number of slots on the carrier 4 indicated by the SFI is 8 times of the number of slots on the carrier 1 indicated by the SFI, and the number of slots on the carrier 5 indicated by the SFI is 16 times of the number of slots on the carrier 1 indicated by the SFI.

The embodiment of the present application describes the number of indicated slots on each carrier, but it does not specifically limit which slot or slots is indicated. For example, the first carrier contains 100 slots, and the above SFI indicates 5 slots among the 100 slots, but it is not specifically limited which 5 slots of the 100 slots are the above-mentioned 5 slots.

In a possible example, a start time of the $i^{th}$ slot indicated by the SFI on the second carrier is the same as a start time of the $[(i-1)*N+1]^{th}$ slot indicated by the SFI on the first carrier, an end time of the $i^{th}$ slot indicated by the SFI on the second carrier is the same as an end time of the $(i*N)^{th}$ slot indicated by the SFI on the first carrier, and the slot formats of $[(i-1)*N+1]^{th}$ slot to the $(i*N)^{th}$ slot indicated by the SFI on the first carrier are the same, where i is a positive integer, and strictly speaking, i is not greater than the number of slots indicated by the SFI on the second carrier.

For example, if N=5 and there are 10 slots on the second carrier, there will be 50 slots on the first carrier. Based on the above rule, it can be known that i can take a positive integer between 1 and 5. When i=1, the start time of the first slot indicated by the SFI on the second carrier is the same as the start time of the first slot indicated by the SFI on the first carrier, the end time of the first slot on the second carrier indicated by the SFI is the same as the end time of the fifth slot indicated by the SFI on the first carrier, and the slot formats of the first to fifth slots indicated by the SFI on the first carrier are the same. When i=2, the start time of the second slot indicated by the SFI on the second carrier and the start time of the sixth slot indicated by the SFI on the first carrier are the same, the end time of the second slot indicated by the SFI on the second carrier is the same as the end time of the tenth slot indicated by the SFI on the first carrier, and the slot formats of the sixth to tenth slots indicated by the SFI on the first carrier are the same. When i takes other values, it can be deduced by analogy, no more examples are given here.

In a possible example, if the start time of the $i^{th}$ slot indicated by the SFI on the second carrier is aligned with the start time of the $[(j-1)*N+1]^{th}$ slot indicated by the SFI on the first carrier, then the end time of the $i^{th}$ slot indicated by the SFI on the second carrier is aligned with the end time of the $(j*N)^{th}$ slot indicated by the SFI on the first carrier, and the slot formats of the $[(j-1)*N+1]^{th}$ to $(j*N)^{th}$ slots indicated by the SFI on the first carrier are the same, where i and j are positive integers.

In a possible example, the first subcarrier spacing is a pre-configured subcarrier spacing. For example, the first subcarrier spacing is predefined in a protocol for use, and both the network device and the terminal learn the first subcarrier spacing.

In a possible example, the first subcarrier spacing is a subcarrier spacing of a carrier carrying the SFI, that is, on which carrier the SFI is to be sent, the subcarrier spacing of this carrier is the first subcarrier spacing, and the carrier carrying the SFI is not the first carrier described above, that is, the SFI is first determined by the subcarrier spacing of the carrier carrying the SFI, so that the SFI can indicate the slot format of the slot on the first carrier.

In a possible example, before the terminal receives the slot format indicator (SFI) sent by the network device, the method further includes: the terminal receiving configuration information sent by the network device, where the configuration information is used to indicate the first subcarrier spacing. That is, the first subcarrier spacing is indicated by the network device sending configuration information in a semi-static or dynamic manner, and the configuration information may also be included in the SFI.

Further, the configuration information sent by the network device may be broadcast information, radio resource control (RRC) signaling, or control information.

In a possible example, the SFI includes a carrier number identifier, and the carrier number identifier is used to indicate the number of carriers in the at least one carrier. That is to say, the number of the at least one carrier needs to be indicated by the carrier number identifier. For example, the SFI contains a field for encapsulating the carrier number identifier. When the value of the field is 011, it indicates that the number of carriers in the at least one carrier is specifically 3. When the value of this field is 101, it indicates that the number of carriers in the at least one carrier is specifically 5.

In a possible example, the SFI includes at least one carrier index, and the number of the carrier index(es) in the at least one carrier index is the same as the number of carrier(s) in the at least one carrier. Each carrier index of the at least one carrier index is for indicating one carrier among the at least one carrier, and the carriers indicated by different carrier indexes in the at least one carrier index are different.

In a possible example, the SFI includes a slot format index. Optionally, the slot format index may be one or multiple. When it is one, the slot formats of all the slots on the at least one carrier are the slot format represented by the one slot format index. When there are multiple slot format indexes, the number of the slot format indexes in the multiple slot format indexes may be the same as the number of the carriers in the at least one carrier, in this way, one slot format index indicates the slot format of the slot on one carrier.

In a possible example, when the at least one carrier is multiple carriers, the SFI includes one slot format identical indication field, which field is used to indicate whether the slots on all carriers indicated by the SFI use the same slot format. For example, if the SFI contains 1 bit of the slot format identical indication field, then when the bit is 1, it indicates that the slots on all carriers indicated by the SFI have the same slot format. At this time, one slot format index may be used to indicate the slot format of the slots on all carriers. When this bit is 0, it means that the slots on all carriers indicated by the SFI have different slot formats. At this time, it is necessary to use the same number of slot format indexes as the number of carriers indicated by the SFI to respectively indicate the slot formats on individual carriers.

For example, in a multi-carrier system or multi-BWP, the terminal supports 8 carriers (numbered 0 to 7), and the network device may configure SFI to indicate the slot formats of N carriers, where 1<=N<=8. For example, N=3, that is, the SFI indicates the slot formats of 3 carriers. Specifically, the SFI includes a field (or domain) for indicating the number of carriers, for example, a 3-bit carrier number identifier is used to indicate the SFI to indicate the applicable number of carriers. Supposing that the SFI needs to indicate the slot formats of the carriers whose carrier indexes are 0, 3, and 6, and the SFI is sent on the carrier 0, the subcarrier spacing of the carrier 0 is 15 kHz, the subcarrier spacing of the carrier 3 is 30 kHz, the subcarrier spacing of the carrier 6 is 60 kHz, and the slot format indicated by the SFI is determined in a predefined manner based on the subcarrier spacing of the carrier 0, that is, 15 kHz. As shown in FIG. 3, FIG. 3 shows 7 fields. From left to right, the first field encapsulates the carrier number identifier 011, indicating that the slot formats of 3 carriers need to be indicated; the second field encapsulates the carrier index 000, indicating the carrier whose carrier index is 0; the slot format index 000010 encapsulated in the third field is used to indicate that the slot format of the slot on the carrier whose carrier index is 0 is the slot format indicated by the slot format index 000010, this slot format index is used to indicate the slot format of one slot on the carrier 0; the carrier index 011 encapsulated in the fourth field is used to indicate the carrier whose carrier index is 3; the slot format index 000001 encapsulated in the fifth field is used to indicate the slot format of the slot on the carrier whose carrier index is 3 is the slot format indicated by the slot format index 000001, this slot format index is used to indicate the slot formats of 2 slots on the carrier 3, and the slot formats of the 2 slots are the same; the carrier index 110 encapsulated in the sixth field is used to indicate the carrier with the carrier index of 6; the slot format index 000011 encapsulated in the seventh field is used to indicate that the slot format of the slot on the carrier whose carrier index is 6 is the slot format indicated by the slot format index 000011, this slot format index is used to indicate the slot formats of 4 slots on the carrier 6, and the slot formats of the 4 slots are the same. It can be understood that a slot format index table is pre-stored in the terminal, and each slot format index in the slot format index table represents one slot format.

In step S402, the terminal determines a slot format on each of the multiple carriers according to the SFI.

Specifically, the terminal parses out the information in the SFI, so as to learn the content indicated by the SFI.

Optionally, the terminal may parse out the slot formats of the slots on which carriers are indicated by the SFI, such as determining the slot formats on which carriers are indicated by the SFI based on the parsed carrier index.

Optionally, since the number of slots of which the slot formats are indicated on each carrier in the at least one carrier has a certain relationship with the first subcarrier, the subcarrier spacing of the target carrier is X times of the first subcarrier spacing; and the number of slots indicated by the SFI on the target carrier is X*Y times, X and Y being positive integers. Therefore, the terminal needs to obtain the values of X and Y here, where the values of X and Y may be specified in the protocol or may be encapsulated in the SFI for the terminal to obtain. It may also be that the terminal obtains the value of the first subcarrier by itself, and then parses out the at least one carrier from the SFI, and calculates X based on the subcarrier spacing of the target carrier in the at least one carrier. At this time, the value of Y may be specified in the protocol, or may be encapsulated in the SFI for the terminal to obtain, so that the terminal can also obtain the values of X and Y. Here, the method for obtaining the value of the first subcarrier by the terminal may be specified in the protocol, and the terminal obtains the value directly from the protocol, or the first subcarrier spacing is indicated in the SFI, or it may be detected by the terminal when receiving uplink data.

Optionally, the terminal determines what kind of slot format is to be used specifically through the parsed out slot format index.

For example, the terminal parses out 7 fields shown in FIG. 3. From left to right, since the first field encapsulates the carrier number identifier 011, it can be determined that the SFI indicates the slot formats of 3 carriers. And the terminal learns in a predefined way that the slot format indicated by the SFI is determined based on the subcarrier spacing of the carrier 0, that is, 15 kHz. Since the carrier index 000 is encapsulated in the second field and the slot format index 000010 is encapsulated in the third field, it can be determined that the slot format of the carrier whose carrier index is 0 is the slot format represented by the slot format index 000010. This slot format index is used to indicate a slot format of one slot on the carrier 0. Since the carrier index encapsulated in the fourth field is 011 and the slot format index encapsulated in the fifth field is 000001, it can be determined that the slot format of the carrier with the carrier index of 3 is the slot format indicated by the slot format index of 000001. This slot format index is used to indicate the slot format of 2 slots on the carrier 3, and the slot formats of the two slots are the same. Because the carrier index 110 is encapsulated in the sixth field and the slot format index 000011 is encapsulated in the seventh field, it can be determined that the slot format of the carrier whose carrier index is 6 is the slot format represented by the slot format index 000011. This slot format index is used to indicate the slot format of the 4 slots on the carrier 6, and the slot formats of the four slots are the same.

In the method shown in FIG. 4, the slot format indicated by the SFI is determined based on the first subcarrier spacing, and the subcarrier spacing of any one of the at least one carrier is an integer multiple of the first subcarrier spacing. Therefore, when the at least one carrier is multiple carriers, the embodiments of the present application can be used to implement the indication of the slot formats of the multi-carrier. When the at least one carrier includes only the first carrier, the embodiments of the present application can be used to implement the indication of the slot format of the first carrier independent from the carrier spacing of the first carrier.

Figure 5:
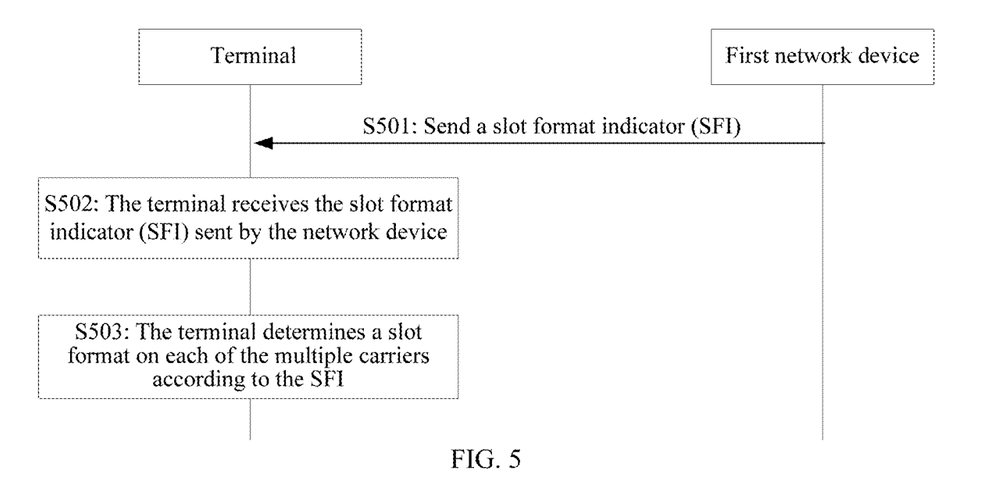
FIG. 5 is a schematic flowchart of another method for indicating a slot format according to an embodiment of the present application.

Consistent with the embodiment shown in FIG. 2, referring to FIG. 5, which is another method for indicating a slot format provided by an embodiment of the present application, this method may be implemented based on the architecture shown in FIG. 1 or may be implemented based on other architectures. The method includes, but is not limited to the following steps.

In step S501, the network device sends a slot format indicator (SFI) to the terminal, where the SFI is used to indicate a slot format of at least one carrier, the at least one carrier includes a first carrier, the slot format indicated by the SFI is determined based on a first subcarrier spacing, and a subcarrier spacing of the first carrier is an integer multiple of the first subcarrier spacing.

Specifically, the first subcarrier spacing is a subcarrier spacing of other carrier except the first carrier, or the first subcarrier spacing is not a subcarrier spacing of a particular carrier, but is a value capable of measuring the subcarrier spacing. It is not excluded that the value of the first subcarrier spacing is the same as the subcarrier spacing of the first carrier, but essentially the slot format indicated by the SFI is not determined based on the subcarrier spacing of the first carrier. In addition, the SFI is used for a slot format of one slot on the first carrier, or the SFI is used for the slot formats of at least two slots on the first carrier.

There is a certain relationship between the number of slots whose slot formats are indicated on each carrier of the at least one carrier and the first subcarrier. Assuming that the target carrier is any one of the at least one carrier, then the subcarrier spacing of the target carrier is X times of the first subcarrier spacing; and the number of the slots indicated by the SFI on the target carrier is X*Y times, where X and Y are both positive integers. It can be understood that when the target carriers are different carriers, the value of X here may also be different. It can be known from this that the subcarrier spacing of the first carrier is also an integer multiple of the first subcarrier spacing.

In a possible example, the at least one carrier further includes a second carrier; a subcarrier spacing of the second carrier is the first subcarrier spacing (optionally, the first subcarrier spacing is a subcarrier spacing on the second carrier at a moment of sending the SFI), the subcarrier spacing of the first carrier is the second subcarrier spacing, and if the second subcarrier spacing is N times of the first subcarrier spacing, the number of slots indicated by the SFI on the first carrier is N times of the number of slots indicated by the SFI on the second carrier, where N is a positive integer.

For example, assuming that the subcarrier spacing of the second carrier is 15 KHz and the subcarrier spacing of the first carrier is 60 KHz, that is, the subcarrier spacing of the first carrier is 4 times of the subcarrier spacing of the second carrier, then, the number of the slots on the first carrier is 4 times of the number of the slots on the second carrier. For example, if there are 10 slots on the second carrier, then there are 40 slots on the first carrier in the same time. Due to such a relationship between the subcarrier spacing of the carrier and the number of slots, in the embodiments of the present application, when the SFI is used to indicate the slot format of the first carrier and the slot format of the second carrier, the relationship between the number of slots indicated on the first carrier and the number of slots indicated on the second carrier is specifically as follows: if the subcarrier spacing (that is, the second subcarrier spacing) of the first carrier is N times of the subcarrier spacing of the second carrier (that is, the first subcarrier spacing), then the number of slots indicated by the SFI on the first carrier is N times of the number of slots indicated by the SFI on the second carrier.

For example, assuming that the subcarrier spacing of the second carrier (that is, the first subcarrier spacing) is 15 KHz, the number of slots on the second carrier is 100, and the subcarrier spacing of the first carrier (that is, the second subcarrier spacing) is 60 KHz, then the number of slots on the first carrier in the same time is 400. In addition, assuming that each SFI indicates a structure of 10 slots on the second carrier, then each SFI indicates 40 slot formats on the first carrier. In this way, it is possible to indicate the slot formats of 100 slots on the second carrier and the slot formats of 400 slots on the first carrier through 10 SFIs.

As another counter example, assuming that the subcarrier spacing of the second carrier (that is, the first subcarrier spacing) is 15 KHz, the number of slots on the second carrier is 100, and the subcarrier spacing of the first carrier (that is, the second subcarrier spacing) is 60 KHz, then the number of slots on the first carrier in the same time is 400. It is also assumed that each SFI indicates a structure of 10 slots on the second carrier, and each SFI indicates 10 slot formats on the first carrier, in this way, the slot formats of 100 slots on the second carrier and the slot formats of 100 slots on the first carrier can be indicated through 10 SFIs, but there are still slot formats of 300 slots on the first carrier not indicated. For this problem, additional SFIs may be configured to indicate the slot formats of the remaining 300 slots on the first carrier, but which may cause additional communication overhead; or the structures of the remaining 300 slots on the first carrier are not indicated, but which may result in a waste of these 300 slot resources.

In addition, the relationship between the number of slots indicated by the SFI on the second carrier and the number of slots indicated by the SFI on the first carrier is only an example. In fact, between any two of the multiple carriers, if the subcarrier spacing of one carrier is N times of the subcarrier spacing of another carrier, then the number of slots indicated by the SFI on the another carrier is N times of the number of slots indicated by the SFI on the one carrier.

For example, supposing that the carrier with the smallest subcarrier spacing among the multiple carriers is called carrier 1, the multiple carriers also include at least a carrier 2, a carrier 3, a carrier 4, and a carrier 5, if the subcarrier spacing of the carrier 1 is 7.5 KHz, the subcarrier spacing of the carrier 2 is 15 KHz, the subcarrier spacing of the carrier 3 is 30 KHz, the subcarrier spacing of the carrier 4 is 60 KHz, and the subcarrier spacing of the carrier 5 is 120 KHz, then the number of slots on the carrier 2 indicated by the above SFI is twice as much as the number of slots on the carrier 1 indicated by the SFI, the number of slots on the carrier 3 indicated by the SFI is 4 times of the number of slots on the carrier 1 indicated by the SFI, the number of slots on the carrier 4 indicated by the SFI is 8 times of the number of slots on the carrier 1 indicated by the SFI, and the number of slots on the carrier 5 indicated by the SFI is 16 times of the number of slots on the carrier 1 indicated by the SFI.

The embodiment of the present application describes the number of indicated slots on each carrier, but it does not specifically limit which slot or slots are indicated. For example, the first carrier contains 100 slots, and the above SFI indicates 5 slots among the 100 slots, but it is not specifically limited which 5 slots of the 100 slots are the above-mentioned 5 slots.

In a possible example, a start time of the $i^{th}$ slot indicated by the SFI on the second carrier is the same as a start time of the $[(i-1)*N+1]^{th}$ slot indicated by the SFI on the first carrier, an end time of the $i^{th}$ slot indicated by the SFI on the second carrier is the same as an end time of the $(i*N)^{th}$ slot indicated by the SFI on the first carrier, and the slot formats of the $[(i-1)*N+1]^{th}$ slot to the $(i*N)^{th}$ slot indicated by the SFI on the first carrier are the same, where i is a positive integer, and strictly speaking, i is not greater than the number of slots indicated by the SFI on the second carrier.

For example, if N=5 and there are 10 slots on the second carrier, there will be 50 slots on the first carrier. Based on the above rule, it can be known that i can take a positive integer between 1 and 5. When i=1, the start time of the first slot indicated by the SFI on the second carrier is the same as the start time of the first slot indicated by the SFI on the first carrier, the end time of the first slot on the second carrier indicated by the SFI is the same as the end time of the fifth slot indicated by the SFI on the first carrier, and the slot formats of the first to fifth slots indicated by the SFI on the first carrier are the same. When i=2, the start time of the second slot indicated by the SFI on the second carrier and the start time of the sixth slot indicated by the SFI on the first carrier are the same, the end time of the second slot indicated by the SFI on the second carrier is the same as the end time of the tenth slot indicated by the SFI on the first carrier, and the slot formats of the sixth to tenth slots indicated by the SFI on the first carrier are the same. When i takes other values, it can be deduced by analogy, no more examples are given here.

In a possible example, if the start time of the $i^{th}$ slot indicated by the SFI on the second carrier is aligned with the start time of the $[(j-1)*N+1]^{th}$ slot indicated by the SFI on the first carrier, then the end time of the $i^{th}$ slot indicated by the SFI on the second carrier is aligned with the end time of the $(j*N)^{th}$ slot indicated by the SFI on the first carrier, and the slot formats of the $[(j-1)*N+1]^{th}$ to $(j*N)^{th}$ slots indicated by the SFI on the first carrier are the same, where i and j are positive integers.

In a possible example, the first subcarrier spacing is a pre-configured subcarrier spacing. For example, the first subcarrier spacing is predefined in a protocol for use, and both the network device and the terminal learn the first subcarrier spacing.

In a possible example, the first subcarrier spacing is a subcarrier spacing of a carrier carrying the SFI, that is, on which carrier the SFI is to be sent, the subcarrier spacing of this carrier is the first subcarrier spacing, and the carrier carrying the SFI is not the first carrier described above, that is, the SFI is first determined by the subcarrier spacing of the carrier carrying the SFI, so that the SFI can indicate the slot format of the slot on the first carrier.

In a possible example, before the network device sends a slot format indicator (SFI) to the terminal, the method further includes: the network device sending configuration information to the terminal, and accordingly, the terminal receiving the configuration information sent by the network device, where the configuration information is used to indicate the first subcarrier spacing. That is, the first subcarrier spacing is indicated by the network device sending the configuration information in a semi-static or dynamic manner, and the configuration information may also be included in the above SFI.

Further, the configuration information sent by the network device may be broadcast information, radio resource control (RRC) signaling, or control information.

In a possible example, the SFI includes a carrier number identifier, and the carrier number identifier is used to indicate the number of carriers in the at least one carrier. That is to say, the number of the at least one carrier needs to be indicated by the carrier number identifier. For example, the SFI contains a field for encapsulating the carrier number identifier. When the value of the field is 011, it indicates that the number of carriers in the at least one carrier is specifically 3. When the value of this field is 101, it indicates that the number of carriers in the at least one carrier is specifically 5.

In a possible example, the SFI includes at least one carrier index, and the number of the carrier indexes in the at least one carrier index is the same as the number of carriers in the at least one carrier. Each carrier index of the at least one carrier index is for indicating one carrier among the at least one carrier, and the carriers indicated by different carrier indexes in the at least one carrier index are different.

In a possible example, the SFI includes a slot format index. Optionally, the slot format index may be one or multiple. When it is one, the slot formats of all the slots on the at least one carrier are the slot format represented by the one slot format index. When there are multiple slot format indexes, the number of the slot format indexes in the multiple slot format indexes may be the same as the number of the carriers in the at least one carrier, in this way, one slot format index indicates the slot format of the slot on one carrier.

In a possible example, when the at least one carrier is multiple carriers, the SFI includes one slot format identical indication field, which field is used to indicate whether the slots on all carriers indicated by the SFI use the same slot format. For example, if the SFI contains 1 bit of the slot format identical indication field, then when the bit is 1, it indicates that the slots on all carriers indicated by the SFI have the same slot format. At this time, one slot format index may be used to indicate the slot format of the slots on all carriers. When this bit is 0, it means that the slots on all carriers indicated by the SFI have different slot formats. At this time, it is necessary to use the same number of slot format indexes as the number of carriers indicated by the SFI to respectively indicate the slot formats on individual carriers.

For example, in a multi-carrier system or multi-BWP, the terminal supports 8 carriers (numbered 0 to 7), and the network device may configure SFI to indicate the slot formats of N carriers, where $1<=N<=8$. For example, N=3, that is, the SFI indicates the slot formats of 3 carriers. Specifically, the SFI includes a field (or domain) for indicating the number of carriers, for example, a 3-bit carrier number identifier is used to indicate the SFI to indicate the applicable number of carriers. Supposing that the SFI needs to indicate the slot formats of the carriers whose carrier indexes are 0, 3, and 6, and the SFI is sent on the carrier 0, the subcarrier spacing of the carrier 0 is 15 kHz, the subcarrier spacing of the carrier 3 is 30 kHz, the subcarrier spacing of the carrier 6 is 60 kHz, and the slot format indicated by the SFI is determined in a predefined manner based on the subcarrier spacing of the carrier 0, that is, 15 kHz. As shown in FIG. 3, FIG. 3 shows 7 fields. From left to right, the first field encapsulates the carrier number identifier 011, indicating that the slot formats of 3 carriers need to be indicated; the second field encapsulates the carrier index 000, indicating the carrier whose carrier index is 0; the slot format index 000010 encapsulated in the third field is used to indicate that the slot format of the slot on the carrier whose carrier index is 0 is the slot format indicated by the slot format index 000010, this slot format index is used to indicate the slot format of one slot on the carrier 0; the carrier index 011 encapsulated in the fourth field is used to indicate the carrier whose carrier index is 3; the slot format index 000001 encapsulated in the fifth field is used to indicate the slot format of the slot on the carrier whose carrier index is 3 is the slot format indicated by the slot format index 000001, this slot format index is used to indicate the slot formats of 2 slots on the carrier 3, and the slot formats of the 2 slots are the same; the carrier index 110 encapsulated in the sixth field is used to indicate the carrier with the carrier index of 6; the slot format index 000011 encapsulated in the seventh field is used to indicate that the slot format of the slot on the carrier whose carrier index is 6 is the slot format indicated by the slot format index 000011, this slot format index is used to indicate the slot formats of 4 slots on the carrier 6, and the slot formats of the 4 slots are the same. It can be understood that a slot format index table is pre-stored in the terminal, and each slot format index in the slot format index table represents one slot format.

In step S502, the terminal receives the slot format indicator (SFI) sent by the network device.

In step S503, the terminal determines a slot format on each of the multiple carriers according to the SFI.

Specifically, the terminal parses out the information in the SFI, so as to learn the content indicated by the SFI.

Optionally, the terminal may parse out the slot formats of the slots on which carriers are indicated by the SFI, such as determining the slot formats on which carriers are indicated by the SFI based on the parsed carrier index.

Optionally, since the number of slots of which the slot formats are indicated on each carrier in the at least one carrier has a certain relationship with the first subcarrier, the subcarrier spacing of the target carrier is X times of the first subcarrier spacing; and the number of slots indicated by the SFI on the target carrier is X*Y times, X and Y being positive integers. Therefore, the terminal needs to obtain the values of X and Y here, where the values of X and Y may be specified in the protocol or may be encapsulated in the SFI for the terminal to obtain. It may also be that the terminal obtains the value of the first subcarrier by itself, and then parses out the at least one carrier from the SFI, and calculates X based on the subcarrier spacing of the target carrier in the at least one carrier. At this time, the value of Y may be specified in the protocol, or may be encapsulated in the SFI for the terminal to obtain, so that the terminal can also obtain the values of X and Y. Here, the method for obtaining the value of the first subcarrier by the terminal may be specified in the protocol, and the terminal obtains the value directly from the protocol, or the first subcarrier spacing is indicated in the SFI, or it may be detected by the terminal when receiving uplink data.

Optionally, the terminal determines what kind of slot format is to be used specifically through the parsed out slot format index.

For example, the terminal parses out 7 fields shown in FIG. 3. From left to right, since the first field encapsulates the carrier number identifier 011, it can be determined that the SFI indicates the slot formats of 3 carriers. And the terminal learns in a predefined way that the slot format indicated by the SFI is determined based on the subcarrier spacing of the carrier 0, that is, 15 kHz. Since the carrier index 000 is encapsulated in the second field and the slot format index 000010 is encapsulated in the third field, it can be determined that the slot format of the carrier whose carrier index is 0 is the slot format represented by the slot format index 000010. This slot format index is used to indicate a slot format of one slot on the carrier 0. Since the carrier index encapsulated in the fourth field is 011 and the slot format index encapsulated in the fifth field is 000001, it can be determined that the slot format of the carrier with the carrier index of 3 is the slot format indicated by the slot format index of 000001. This slot format index is used to indicate the slot format of 2 slots on the carrier 3, and the slot formats of the two slots are the same. Because the carrier index 110 is encapsulated in the sixth field and the slot format index 000011 is encapsulated in the seventh field, it can be determined that the slot format of the carrier whose carrier index is 6 is the slot format represented by the slot format index 000011. This slot format index is used to indicate the slot format of the 4 slots on the carrier 6, and the slot formats of the four slots are the same.

In the method shown in FIG. 5, the slot format indicated by the SFI is determined based on the first subcarrier spacing, and the subcarrier spacing of any one of the at least one carrier is an integer multiple of the first subcarrier spacing. Therefore, when the at least one carrier is multiple carriers, the embodiments of the present application can be used to implement the indication of the slot formats of the multi-carrier. When the at least one carrier includes only the first carrier, the embodiments of the present application can be used to implement the indication of the slot format of the first carrier independent from the carrier spacing of the first carrier.

Figure 6:
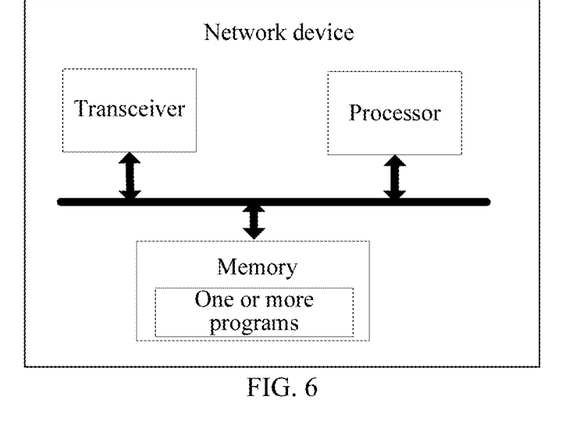
FIG. 6 is a schematic structural diagram of a network device according to an embodiment of the present application.

Consistent with the above embodiments, referring to FIG. 6, which is a schematic structural diagram of a network device according to an embodiment of the present application, the network device is a first network device. As shown in the figure, the network device includes a processor, a memory, a transceiver, and one or more programs, where the one or more programs are stored in the memory and configured to be executed by the processor, and the program includes instructions for performing the following steps:

sending a slot format indicator (SFI), where the SFI is used to indicate a slot format of at least one carrier, the at least one carrier includes a first carrier, the slot format indicated by the SFI is determined based on a first subcarrier spacing, and a subcarrier spacing of the first carrier is an integer multiple of the first subcarrier spacing.

It can be seen that, in the embodiments of the present application, the slot format indicated by the SFI is determined based on the first subcarrier spacing, and the subcarrier spacing of any one of the at least one carrier is an integer multiple of the first subcarrier spacing. Therefore, when the at least one carrier is multiple carriers, the embodiments of the present application can be used to implement the indication of the slot formats of the multi-carrier. When the at least one carrier includes only the first carrier, the embodiments of the present application may achieve the indication of the slot format of the first carrier without relying on the carrier spacing of the first carrier.

In a possible example, the at least one carrier further includes a second carrier; a subcarrier spacing of the second carrier is the first subcarrier spacing, and a subcarrier spacing of the first carrier is a second subcarrier spacing, if the second subcarrier spacing is N times of the first subcarrier spacing, the number of slots indicated by the SFI on the first carrier is N times of the number of slots indicated the SFI on the second carrier, where N is a positive integer.

In a possible example, a start time of the $i^{th}$ slot indicated by the SFI on the second carrier is the same as a start time of the $[(i-1)*N+1]^{th}$ slot indicated by the SFI on the first carrier, an end time of the $i^{th}$ slot indicated by the SFI on the second carrier is the same as an end time of the $(i*N)^{th}$ slot indicated by the SFI on the first carrier, and the slot formats of the $[(i-1)*N+1]^{th}$ slot to the $(i*N)^{th}$ slot indicated by the SFI on the first carrier are the same, where i is a positive integer In a possible example, the first subcarrier spacing is a pre-configured subcarrier spacing, or the first subcarrier spacing is a subcarrier spacing of a carrier carrying the SFI, or the first subcarrier spacing is a subcarrier spacing configured by the network device sending configuration information.

In a possible example, the SFI includes a carrier number identifier, and the carrier number identifier is used to indicate the number of carriers included in the at least one carrier.

In a possible example, the SFI includes at least one carrier identity identifier, and the number of the carrier identity identifiers in the at least one carrier identifier is the same as the number of carriers. Each carrier identity identifier in the at least one carrier identity identifier is used to indicate one carrier in the at least one carrier, and the carriers indicated by different carrier identity identifiers in the at least one carrier identity identifier are different.

Figure 7:
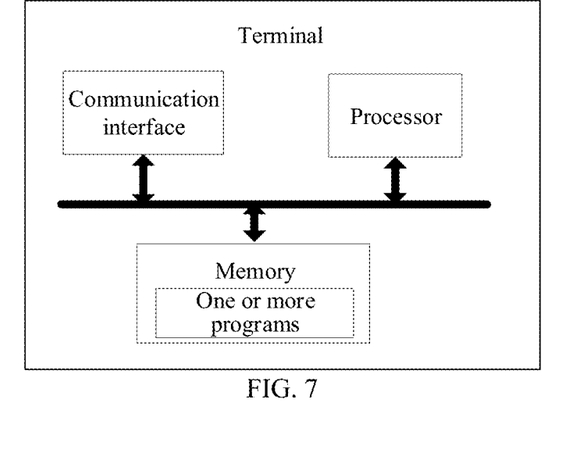
FIG. 7 is a schematic structural diagram of a terminal according to an embodiment of the present application.

Consistent with the above embodiments, referring to FIG. 7, which is a schematic structural diagram of a terminal provided by an embodiment of the present application, the terminal includes a processor, a memory, a communication interface, and one or more programs. The one or more programs are stored in the memory and configured to be executed by the processor, and the program includes instructions for performing the following steps.

First, a slot format indicator (SFI) sent by the network device is received. The SFI is used to indicate a slot format of at least one carrier, the at least one carrier includes a first carrier, the slot format indicated by the SFI is determined based on a first subcarrier spacing, and a subcarrier spacing of the first carrier is an integer multiple of the first subcarrier spacing.

Then, a slot format on each carrier in the at least one carrier is determined according to the SFI.

It can be seen that, in the embodiments of the present application, the slot format indicated by the SFI is determined based on the first subcarrier spacing, and the subcarrier spacing of any one of the above at least one carrier is an integer multiple of the first subcarrier spacing. Therefore, when the at least one carrier is multiple carriers, the embodiments of the present application can be used to implement the indication of the slot formats of the multi-carrier. When the at least one carrier includes only the first carrier, the embodiments of the present application can be used to achieve the indication of the slot format of the first carrier without relying on the carrier spacing of the first carrier.

In a possible example, the at least one carrier further includes a second carrier; a subcarrier spacing of the second carrier is the first subcarrier spacing, and a subcarrier spacing of the first carrier is a second subcarrier spacing, if the second subcarrier spacing is N times of the first subcarrier spacing, the number of slots indicated by the SFI on the first carrier is N times of the number of slots indicated by the SFI on the second carrier, where N is a positive integer.

In a possible example, a start time of the $i^{th}$ slot indicated by the SFI on the second carrier is the same as a start time of the $[(i-1)*N+1]^{th}$ slot indicated by the SFI on the first carrier, an end time of the $i^{th}$ slot indicated by the SFI on the second carrier is the same as an end time of the $(i*N)^{th}$ slot indicated by the SFI on the first carrier, and the slot formats of the $[(i-1)*N+1]^{th}$ slot to the $(i*N)^{th}$ slot indicated by the SFI on the first carrier are the same, where i is a positive integer In a possible example, the first subcarrier spacing is a pre-configured subcarrier spacing, or the first subcarrier spacing is a subcarrier spacing of a carrier carrying the SFI, or the first subcarrier spacing is a subcarrier spacing configured by the network device sending configuration information.

In a possible example, the SFI includes a carrier number identifier, and the carrier number identifier is used to indicate the number of carriers included in the at least one carrier.

In a possible example, the SFI includes at least one carrier identity identifier, and the number of the carrier identity identifiers in the at least one carrier identifier is the same as the number of carriers. Each carrier identity identifier in the at least one carrier identity identifier is used to indicate one carrier in the at least one carrier, and the carriers indicated by different carrier identity identifiers in the at least one carrier identity identifier are different.

The above mainly introduces the solutions of the embodiments of the present application from the perspective of interaction between various network elements. It can be understood that, in order to implement the above functions, the terminal and the network device include a hardware structure and/or a software module for executing the corresponding individual functions. Those skilled in the art should easily realize that, with reference to the units and algorithm steps of the various examples described in the embodiments disclosed herein, this application can be implemented in the form of hardware or a combination of hardware and computer software. Whether a certain function is performed by hardware or computer software-driven hardware depends on the specific application and design constraints of the technical solution. The professional technicians may use different methods to implement the described functions for each specific application, but such implementation should not be considered beyond the scope of this application.

The embodiments of the present application can divide the functional units of the terminal and the network device according to the foregoing method examples. For example, each functional unit can be divided corresponding to each function, or two or more functions can be integrated into one processing unit. The above integrated unit may be implemented in the form of hardware or in the form of software program modules. It should be noted that the division of the units in the embodiments of the present application is schematic, and is only a logical function division. In actual implementation, there may be other division manners.

Figure 8:
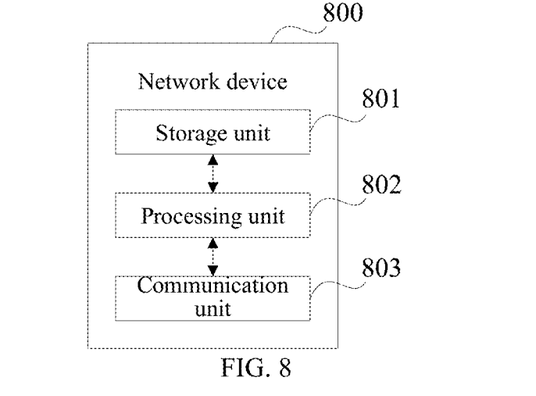
FIG. 8 is a schematic structural diagram of still another network device according to an embodiment of the present application.

In the case of using an integrated unit, FIG. 8 shows a block diagram of a possible functional unit of a network device involved in the foregoing embodiments, and the network device is a first network device. The network device 800 includes a processing unit 802 and a communication unit 803. The processing unit 802 is configured to control and manage the actions of the network device. For example, the processing unit 802 is configured to support the network device to perform step S201 in FIG. 2, 501 in FIG. 5, and/or other processes for the technology described herein. The communication unit 803 is configured to support communication between the network device and other devices, for example, communication with the terminal shown in FIG. 7. The network device may further include a storage unit 801 for storing program code and data of the network device.

The processing unit 802 may be a processor or a controller, the communication unit 803 may be a transceiver, a transceiver circuit, a radio frequency chip, and the like, and the storage unit 801 may be a memory.

The processing unit 802 is configured to send a slot format indicator (SFI) to the terminal through the communication unit 803, where the SFI is used to indicate a slot format of at least one carrier, the at least one carrier includes a first carrier, the slot format indicated by the SFI is determined based on a first subcarrier spacing, and a subcarrier spacing of the first carrier is an integer multiple of the first subcarrier spacing.

In a possible example, the at least one carrier further includes a second carrier; a subcarrier spacing of the second carrier is the first subcarrier spacing, and a subcarrier spacing of the first carrier is a second subcarrier spacing, if the second subcarrier spacing is N times of the first subcarrier spacing, the number of slots indicated by the SFI on the first carrier is N times of the number of slots indicated by the SFI on the second carrier, where N is a positive integer.

In a possible example, a start time of the $i^{th}$ slot indicated by the SFI on the second carrier is the same as a start time of the $[(i-1)*N+1]^{th}$ slot indicated by the SFI on the first carrier, an end time of the $i^{th}$ slot indicated by the SFI on the second carrier is the same as an end time of the $(i*N)^{th}$ slot indicated by the SFI on the first carrier, and the slot formats of $[(i-1)*N+1]^{th}$ slot to the $(i*N)^{th}$ slot indicated by the SFI on the first carrier are the same, i being a positive integer.

In a possible example, the first subcarrier spacing is a pre-configured subcarrier spacing, or the first subcarrier spacing is a subcarrier spacing of a carrier carrying the SFI, or the first subcarrier spacing is a subcarrier spacing configured by configuration information sent by the network device.

In a possible example, the SFI includes a carrier number identifier, and the carrier number identifier is used to indicate the number of carriers included in the at least one carrier.

In a possible example, the SFI includes identity identifier, the number of the carrier identity identifier in the at least one carrier identity identifier is the same as the number of the carriers, each carrier identity identifier in the at least one carrier identity identifier is used to indicate one carrier in the at least one carrier, and the carriers indicated by different carrier identity identifiers in the at least one carrier identity are different.

When the processing unit 802 is a processor, the communication unit 803 is a communication interface, and the storage unit 801 is a memory, the network device involved in the embodiments of the present application may be the network device shown in FIG. 6.

Figure 9:
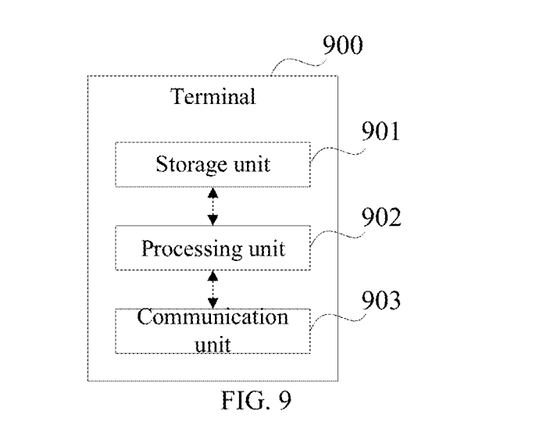
FIG. 9 is a schematic structural diagram of still another terminal provided by an embodiment of the present application.

In the case of using the integrated unit, FIG. 9 shows a block diagram of a possible functional unit composition of the terminal involved in the foregoing embodiments. The terminal 900 includes a processing unit 902 and a communication unit 903. The processing unit 902 is configured to control and manage the actions of the terminal. For example, the processing unit 902 is configured to support the terminal to perform the steps 401-402 in FIG. 4, the steps 402-403 in FIG. 5 and/or other processes of the technology described herein. The communication unit 903 is configured to support communication between the terminal and other device, for example, communication with the network device shown in FIG. 6. The terminal may further include a storage unit 901 for storing program code and data of the terminal.

The processing unit 902 may be a processor or a controller, for example, it may be a Central Processing Unit (CPU), a general-purpose processor, a Digital Signal Processor (DSP), and an Application-Specific Integrated Circuit (ASIC), a Field Programmable Gate Array (FPGA), or other programmable logic devices, transistor logic devices, hardware components, or any combination thereof. It may implement or execute various exemplary logical blocks, modules, and circuits described in connection with the disclosure of this application. The processor may also be a combination that realizes computing functions, for example, a combination including one or more microprocessors, a combination of a DSP and a microprocessor, and so on. The communication unit 903 may be a transceiver, a transceiver circuit, and the like, and the storage unit 901 may be a memory.

The processing unit 902 is configured to receive, through the communication unit 903, a slot format indicator (SFI) sent by a network device. The SFI is used to indicate a slot format of at least one carrier, the at least one carrier includes a first carrier, the slot format indicated by the SFI is determined based on a first subcarrier spacing, and a subcarrier spacing of the first carrier is an integer multiple of the first subcarrier spacing. The processing unit 902 is further configured to determine a slot format on each of the at least one carrier according to the SFI.

In a possible example, the at least one carrier further includes a second carrier; a subcarrier spacing of the second carrier is the first subcarrier spacing, and a subcarrier spacing of the first carrier is a second subcarrier spacing, if the second subcarrier spacing is N times of the first subcarrier spacing, the number of slots indicated by the SFI on the first carrier is N times of the number of slots indicated the SFI on the second carrier, where N is a positive integer.

In a possible example, a start time of the $i^{th}$ slot indicated by the SFI on the second carrier is the same as a start time of the $[(i-1)*N+1]^{th}$ slot indicated by the SFI on the first carrier, an end time of the $i^{th}$ slot indicated by the SFI on the second carrier is the same as an end time of the $(i*N)^{th}$ slot indicated by the SFI on the first carrier, and the slot formats of $[(i-1)*N+1]^{th}$ slot to the $(i*N)^{th}$ slot indicated by the SFI on the first carrier are the same, i being a positive integer.

In a possible example, the first subcarrier spacing is a pre-configured subcarrier spacing, or the first subcarrier spacing is a subcarrier spacing of a carrier carrying the SFI, or the first subcarrier spacing is a subcarrier spacing configured by configuration information sent by the network device.

In a possible example, the SFI includes a carrier number identifier, and the carrier number identifier is used to indicate the number of carriers included in the at least one carrier.

In a possible example, the SFI includes at least one carrier identity identifier, the number of the carrier identity identifier in the at least one carrier identity identifier is the same as the number of the carriers, each carrier identity identifier in the at least one carrier identity identifier is used to indicate one carrier in the at least one carrier, and the carriers indicated by different carrier identity identifiers in the at least one carrier identity are different.

When the processing unit 902 is a processor, the communication unit 903 is a communication interface, and the storage unit 901 is a memory, the terminal involved in the embodiments of the present application may be the terminal shown in FIG. 7.

The embodiments of the present application further provide a computer-readable storage medium, where the computer-readable storage medium stores a computer program for electronic data exchange, and the computer program causes a computer to execute some or all of the steps described in the terminal in the foregoing method embodiments.

The embodiments of the present application further provide a computer-readable storage medium, where the computer-readable storage medium stores a computer program for electronic data exchange, and the computer program causes a computer to execute some or all of the steps described in the network device in the foregoing method embodiments.

The embodiments of the present application further provide a computer program product, where the computer program product includes a non-transitory computer-readable storage medium storing a computer program, and the computer program is operable to cause a computer to execute some or all of the steps described in the terminal in the method embodiments described above. The computer program product may be a software installation package.

The embodiments of the present application further provide a computer program product, where the computer program product includes a non-transitory computer-readable storage medium storing a computer program, and the computer program is operable to cause a computer to execute some or all of the steps described by the network device in the above method. The computer program product may be a software installation package.

The steps of the method or algorithm described in the embodiments of the present application may be implemented in a hardware manner, or may be implemented in a manner that a processor executes software instructions. The software instructions may be composed of corresponding software modules. The software modules may be stored in a Random Access Memory (RAM), a flash memory, a Read Only Memory (ROM), an Erasable Programmable ROM (EPROM), an Electrically EPROM (EEPROM), a register, a hard drive, a removable hard drive, a CD-ROM, or any other form of storage medium known in the art. An exemplary storage medium is coupled to the processor such that the processor can read information from, and write information to, the storage medium. The storage medium may also be an integral part of the processor. The processor and the storage medium may reside in an ASIC. In addition, the ASIC may be located in an access network device, a target network device, or a core network device. The processor and the storage medium may also exist as discrete components in an access network device, a target network device, or a core network device.

Those skilled in the art should be aware that, in one or more of the above examples, the functions described in the embodiments of the present application may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions according to the embodiments of the present application are wholly or partially generated. The computer may be a general-purpose computer, a special-purpose computer, a computer network, or other programmable devices. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server or data center via wired (such as a coaxial cable, an optical fiber, and a Digital Subscriber Line (DSL)) or wireless (such as infrared, wireless, and microwave). The computer-readable storage medium may be any available medium that can be accessed by a computer or a data storage device such as a server, a data center, or the like that includes one or more available medium integration. The available medium may be a magnetic medium (for example, a floppy disk, a hard disk, and a magnetic tape), an optical medium (for example, a Digital Video Disc (DVD)), or a semiconductor medium (for example, a Solid State Disk (SSD)), or the like.

The specific implementation manners described above further describe the objectives, technical solutions, and beneficial effects of the embodiments of the present application in detail. It should be understood that the foregoing are only specific implementation manners of the embodiments of the present application, and are not used for limiting the protection scope of the embodiments of the present application. Any modification, equivalent replacement, or improvement made on the basis of the technical solutions of the embodiments of the present application shall be included in the protection scope of the embodiments of the present application.

What is claimed is:

1. A method for indicating a slot format, comprising:
   sending, by a network device, a slot format indicator (SFI) to a terminal, wherein the SFI is used to indicate a slot format of at least one carrier, the at least one carrier comprises a first carrier, and a subcarrier spacing of the first carrier is X multiple of a first subcarrier spacing, X being a positive integer; wherein the first subcarrier spacing is configured by radio resource control (RRC) signaling;
   wherein each slot format indicated by the SFI is used to determine slot formats of X slots of the first carrier;
   wherein the SFI comprises a slot format index, wherein the slot format index is used to indicate the slot format of the at least one carrier, and the slot format index is sent in a field corresponding the carrier for which the slot format is indicated;
   wherein the at least one carrier further comprises a second carrier, wherein a subcarrier spacing of the second carrier is equal to the first subcarrier spacing, and each slot format indicated by the SFI is used to determine a slot format of one slot of the second carrier; and
   wherein a start time of an $i^{th}$ slot indicated by the SFI on the second carrier is the same as a start time of an $[(i-1)*X+1]^{th}$ slot indicated by the SFI on the first carrier, an end time of the $i^{th}$ slot indicated by the SFI on the second carrier is the same as an end time of an $(i*X)^{th}$ slot indicated by the SFI on the first carrier, and the slot formats of the $[(i-1)*X+1]^{th}$ slot to the $(i*X)^{th}$ slot indicated by the SFI on the first carrier are the same, i being a positive integer.

2. The method according to claim 1, wherein the at least one carrier further comprises a third carrier;
   wherein the subcarrier spacing of the first carrier is a second subcarrier spacing, and wherein the second subcarrier spacing of the first carrier is N times a subcarrier spacing of the third carrier, and a number of slots indicated by the SFI on the first carrier is N times a number of slots indicated by the SFI on the third carrier, wherein N is a positive integer.

3. The method according to claim 1, wherein the first subcarrier spacing is 15 KHz, and the subcarrier spacing of the first carrier is 60 KHz.

4. The method according to claim 1, wherein the value of X is one of: 2, 4, 8, 16.

5. A method for indicating a slot format, comprising:
   receiving, by a terminal, a slot format indicator (SFI) sent by a network device, wherein the SFI is used to indicate a slot format of at least one carrier, the at least one carrier comprises a first carrier, and a subcarrier spacing of the first carrier is X multiple of a first subcarrier spacing, X being a positive integer; and determining, by the terminal, slot formats of X slots of the first carrier according to each slot format indicated by the SFI;

wherein the SFI comprises a slot format index, wherein the slot format index is used to indicate the slot format of the at least one carrier, and the slot format index is sent in a field corresponding the carrier for which the slot format is indicated;

wherein the at least one carrier further comprises a second carrier, wherein a subcarrier spacing of the second carrier is equal to the first subcarrier spacing, and each slot format indicated by the SFI is used to determine a slot format of one slot of the second carrier; and wherein a start time of an $i^{th}$ slot indicated by the SFI on the second carrier is the same as a start time of an $[(i-1)*X+1]^{th}$ slot indicated by the SFI on the first carrier, an end time of the $i^{th}$ slot indicated by the SFI on the second carrier is the same as an end time of an $(i*X)^{th}$ slot indicated by the SFI on the first carrier, and the slot formats of the $[(i-1)*X+1]^{th}$ slot to the $(i*X)^{th}$ slot indicated by the SFI on the first carrier are the same, i being a positive integer.

6. The method according to claim 5, wherein at least one carrier further comprises a third carrier;

wherein the subcarrier spacing of the first carrier is a second subcarrier spacing, and wherein the second subcarrier spacing of the first carrier is N times a subcarrier spacing of the third carrier, and a number of slots indicated by the SFI on the first carrier is N times a number of slots indicated by the SFI on the third carrier, wherein N is a positive integer.

7. The method according to claim 5, wherein the first subcarrier spacing is 15 KHz, and the subcarrier spacing of the first carrier is 60 KHz.

8. The method according to claim 5, wherein the value of X is one of: 2, 4, 8, 16.

9. A network device, comprising: a processor, a memory, a transceiver, and one or more programs, wherein the one or more programs are stored in the memory and are configured to be executed by the processor, and the program comprises instructions for performing:

sending a slot format indicator (SFI) to a terminal, wherein the SFI is used to indicate a slot format of at least one carrier, the at least one carrier comprises a first carrier, and a subcarrier spacing of the first carrier is X multiple of a first subcarrier spacing, X being a positive integer;

wherein each slot format indicated by the SFI is used to determine slot formats of X slots of the first carrier;

wherein the SFI comprises a slot format index, wherein the slot format index is used to indicate the slot format of the at least one carrier, and the slot format index is sent in a field corresponding the carrier for which the slot format is indicated;

wherein the at least one carrier further comprises a second carrier, wherein a subcarrier spacing of the second carrier is equal to the first subcarrier spacing, and each slot format indicated by the SFI is used to determine a slot format of one slot of the second carrier;

wherein a start time of an $i^{th}$ slot indicated by the SFI on the second carrier is the same as a start time of an $[(i-1)*X+1]^{th}$ slot indicated by the SFI on the first carrier, an end time of the $i^{th}$ slot indicated by the SFI on the second carrier is the same as an end time of an $(i*X)^{th}$ slot indicated by the SFI on the first carrier, and the slot formats of the $[(i-1)*X+1]^{th}$ slot to the $(i*X)^{th}$ slot indicated by the SFI on the first carrier are the same, i being a positive integer.

10. The network device according to claim 9, wherein the at least one carrier further comprises a third carrier;

wherein the subcarrier spacing of the first carrier is a second subcarrier spacing, and wherein the second subcarrier spacing of the first carrier is N times a subcarrier spacing of the third carrier, and a number of slots indicated by the SFI on the first carrier is N times a number of slots indicated by the SFI on the third carrier, wherein N is a positive integer.

11. The network device according to claim 9, wherein the value of X is one of: 2, 4, 8, 16.

12. A terminal, comprising: a processor, a memory, a communication interface, and one or more programs, wherein the one or more programs are stored in the memory and configured to be executed by the processor, and the program comprises instructions for performing:

receiving a slot format indicator (SFI) sent by a network device, wherein the SFI is used to indicate a slot format of at least one carrier, the at least one carrier comprises a first carrier, and a subcarrier spacing of the first carrier is X multiple of a first subcarrier spacing, X being a positive integer; and determining slot formats of X slots of the first carrier according to each slot format indicated by the SFI;

wherein the SFI comprises a slot format index, wherein the slot format index is used to indicate the slot format of the at least one carrier, and the slot format index is sent in a field corresponding the carrier for which the slot format is indicated;

wherein the at least one carrier further comprises a second carrier, wherein a subcarrier spacing of the second carrier is equal to the first subcarrier spacing, and each slot format indicated by the SFI is used to determine a slot format of one slot of the second carrier;

wherein a start time of an $i^{th}$ slot indicated by the SFI on the second carrier is the same as a start time of an $[(i-1)*X+1]^{th}$ slot indicated by the SFI on the first carrier, an end time of the $i^{th}$ slot indicated by the SFI on the second carrier is the same as an end time of an $(i*X)^{th}$ slot indicated by the SFI on the first carrier, and the slot formats of the $[(i-1)*X+1]^{th}$ slot to the $(i*X)^{th}$ slot indicated by the SFI on the first carrier are the same, i being a positive integer.

13. The terminal according to claim 12, wherein values of X is one of: 2, 4, 8, 16.

14. The terminal according to claim 12, wherein the at least one carrier further comprises a third carrier;

wherein the subcarrier spacing of the first carrier is a second subcarrier spacing, and wherein the second subcarrier spacing of the first carrier is N times a subcarrier spacing of the third carrier, and a number of slots indicated by the SFI on the first carrier is N times a number of slots indicated by the SFI on the third carrier, wherein N is a positive integer.

15. The terminal according to claim 12, wherein the first subcarrier spacing is 15 KHz, and the subcarrier spacing of the first carrier is 60 KHz.

16. The network device according to claim 9, wherein the first subcarrier spacing is 15 KHz, and the subcarrier spacing of the first carrier is 60 KHz.

* * * * *